US006248438B1

(12) United States Patent
Ho et al.

(10) Patent No.: US 6,248,438 B1
(45) Date of Patent: Jun. 19, 2001

(54) METHOD FOR PREPARING A PAPER LABEL

(75) Inventors: Kim Sang Ho, Richboro, PA (US); Don Gordon Pierson, Charlotte, NC (US)

(73) Assignee: Rohm and Haas Company, Phila., PA (US)

( * ) Notice: Subject to any disclaimer, the term of this patent is extended or adjusted under 35 U.S.C. 154(b) by 0 days.

(21) Appl. No.: 08/548,033

(22) Filed: Oct. 25, 1995

(51) Int. Cl.⁷ ...................................................... C09J 7/04
(52) U.S. Cl. ............... 428/330; 428/355 R; 428/355 AC
(58) Field of Search .................................... 428/343, 323, 428/330, 355 R, 355 AC; 525/92 J, 189, 212, 291

(56) References Cited

U.S. PATENT DOCUMENTS

| 3,922,464 | 11/1975 | Silver et al. | 428/355 |
|---|---|---|---|
| 3,931,087 | 1/1976 | Baatz et al. | 260/29.6 |
| 4,012,560 | 3/1977 | Baatz et al. | 428/474 |
| 4,624,893 | * 11/1986 | Shibano | 428/354 |
| 5,116,678 | 5/1992 | Knutson | 428/355 |
| 5,623,011 | * 4/1997 | Benard | 524/270 |

FOREIGN PATENT DOCUMENTS

| 26 44 776 | 4/1976 | (DE) . |
|---|---|---|
| 0 225 541 | 6/1987 | (EP) . |
| 265678A | 3/1990 | (JP) . |
| 6-065551A | 3/1994 | (JP) . |
| WO 96 05248 | 2/1996 | (WO) . |

* cited by examiner

Primary Examiner—Blaine Copenheaver
(74) Attorney, Agent, or Firm—Gary D. Greenblatt

(57) ABSTRACT

A method for preparing a pressure sensitive paper label is provided. The method is particularly useful on filled papers, especially papers filled with inorganic fillers containing multivalent cation. The pressure sensitive adhesive contains from 0.1 percent to 5 percent of a selected acid monomer, and 99.9 percent to 95 percent of at least one ethenically unsaturated monomer. Paper labels made by the method of this invention have superior age-resistance properties, and may be applied to a wide variety of substrates such as paper, metal, glass, wood, painted surfaces, corrugated board and plastic.

12 Claims, No Drawings

METHOD FOR PREPARING A PAPER LABEL

The present invention relates to a method for preparing a pressure sensitive paper label. In particular, the method of the present invention produces a label from paper filled with inorganic filler containing multivalent cation. The filled paper label of the present invention resists deterioration of the label's adhesive strength, which is known in the industry as age-resistance. Age-resistant pressure sensitive paper labels prepared by the method of the present invention may be applied to a wide variety of substrates.

Age-resistance is the ability of a label to retain adhesive strength over time. Loss of adhesive strength results in a label that may not stick to a substrate or may easily fall off after being applied to a substrate. Age resistance is particularly a problem in labels made from filled paper having inorganic fillers which contain multivalent cation. Paper having inorganic fillers, such as clay and calcium carbonate, is finding increasing use in the label industry due to its lower cost. Unfortunately, the increasing use of filled paper makes the associated age-resistance problem an increasing concern.

One attempt to improve the age-resistance of filled paper is disclosed in Japanese patent application J 03-265678A by Hori, et al. ("Hori"). Hori discloses that the problem of age-resistance is attributed to crosslinking of carboxylic acid groups in the polymer adhesive by cations in the filler. This crosslinking reduces the adhesive strength of the label adhesive. Hori discloses minimizing the age-resistance problem by reducing the level of carboxylic acid in the pressure sensitive adhesive polymer to between 0.1–1.0% by weight. Unfortunately, reducing the level of carboxylic acid has two disadvantages. First, the lower level of carboxylic acid only reduces, rather than eliminates the cross-linking problem, and second, the lower level of carboxylic acid reduces the polymer stability.

Carboxylic acid groups are added into an emulsion polymer to help stabilize the polymer. Reducing the level of carboxylic acid correspondingly reduces the stability of the composition. To compensate for the decrease in stability, Hori, discloses adding a water soluble acrylic resin to the composition.

The present invention has overcome the problem of age-resistance on filled paper by eliminating carboxylic acid groups from the adhesive composition, without requiring additional stabilizers. We have found that age-resistant, filled-paper labels can be prepared using a stable copolymer made from selected acid monomers. Filled paper labels prepared by the method of the present invention are useful for application to various substrates such as paper, glass, metal, cardboard, wood, corrugated board and plastic.

In a first aspect of the present invention, there is provided a method for preparing a paper label comprising:

a) forming a copolymer comprising, as polymerized units:
   1) from 0.1 percent to 5 percent by weight of an acid monomer or monovalent salts thereof, said acid monomer being selected from the group consisting of vinyl sulfonic acid, methallyl sulfonic acid, phosphoethylmethacrylate, (meth)acrylate sulfonic acid, acrylamido alkyl sulfonic acid, N-(2-sulfo-1,1-dimethylethyl)acrylamide, 2-acrylamido-2-methylpropanesulfonic acid and mixtures thereof; and
   2) from 99.9 percent to 95 percent by weight of at least one ethenically unsaturated monomer;
   wherein the glass transition temperature of said copolymer is in the range of from 0° C. to −80° C.; wherein said copolymer has a molecular weight in the range of from 5,000 to 10,000,000;
b) formulating said copolymer into an adhesive composition; and
c) applying said adhesive composition to a paper label comprising inorganic filler to form a pressure sensitive adhesive label; wherein said inorganic filler comprises multivalent cation.

In a second aspect of the present invention, there is provided a pressure sensitive adhesive composition comprising a copolymer comprising, as polymerized units:

a) from 0.1 percent to 5 percent by weight of an add monomer, or monovalent salts thereof, said acid monomer being selected from the group consisting of sodium vinyl sulfonate, sodium methallyl sulfonate, phosphoethylmethacrylate, and mixtures thereof; and
b) from 99.9 percent to 95 percent by weight a second monomer comprising at least one ethenically unsaturated monomer; wherein said copolymer has a glass transition temperature in the range of from 0° C. to −80° C.; and wherein said copolymer has a molecular weight in the range of from 5,000 to 10,000,000.

In a third aspect of the present invention, there is provided an article comprising a filled paper basestock coated on at least one side with a pressure sensitive adhesive composition.

The present invention provides a method for preparing a paper label from paper filled with inorganic fillers using an adhesive composition containing a copolymer made from selected monomers.

Copolymer

The adhesive composition of the present invention contains a copolymer of at least one selected acid monomer and at least one ethenically unsaturated monomer. As used herein, "(meth)acrylate" shall mean either acrylate or methacrylate. "Alkyl" herein shall mean either straight chain or branched carbon groupings having in the range of from one to twenty carbon atoms.

Selected acid monomers, and mixtures of those acid monomers, are useful in the present invention. "Acid monomer" as used herein includes the acid monomer as well as monovalent salts of the monomer. Selected acid monomers resist crosslinking by multivalent cation when incorporated into a copolymer. Selected acid monomers useful in this invention include vinyl sulfonic acid, methallyl sulfonic acid, styrene sulfonic acid, phosphoethylmethacrylate, (meth)acrylate sulfonic acid, acrylamido alkane sulfonic acid, N-(2-sulfo-1,1-dimethylethyl)acrylamide, and 2-acrylamido-2-methylpropanesulfonic acid. Monovalent salts useful in this invention are preferably lithium, sodium, potassium, rubidium and cesium salts, more preferably sodium and potassium salts and most preferably sodium salts such as, for example, sodium vinyl sulfonate, sodium styrene sulfonate, and sodium methallyl sulfonate.

The copolymer of this invention contains from 0.1 percent to 5 percent of the acid monomer by weight of the copolymer, and preferably from 0.2 percent to 4 percent acid monomer by weight of the copolymer. The use of lower levels of acid monomer results in a loss of latex polymer stability in water. Higher levels of acid monomer result in excessive thickening during polymerization.

The polymers of this invention are copolymers of the acid monomer and at least one ethenically unsaturated monomer. The ethenically unsaturated monomer is present in the polymer at 99.9% to 95% by weight. Examples of useful ethenically unsaturated monomers include simple olefins such as ethylene, alkyl (meth)acrylates where the alkyl group has 1 to 20 carbon atoms (preferably 1 to 12 carbon atoms), vinyl acetate, acrylonitrile, styrene, isobornyl methacrylate, acrylamide, hydroxyethyl (meth)acrylate, hydroxypropyl (meth)acrylate, N-vinyl pyrolidinone, butadiene, isoprene, vinyl halides such as vinyl chloride and vinylidene chloride, alkyl maleates, and alkyl fumarates.

Generally, the polymer of the present invention is prepared by means known in the art, such as dispersion or emulsion polymerization in water. Preferably, the copolymer is prepared by aqueous emulsion polymerization using a suitable free radical initiator and appropriate heating. Conventional dispersants may be used at levels in the range of from 0.1 percent to 6 percent by weight based on the weight of total monomer. Initiation can be by either thermal or redox initiation using conventional free radical initiators such as, for example, hydrogen peroxide, organic hydroperoxides, and organic peroxides, at levels of from 0.05 percent to 3.0 percent by weight based on the weight of total monomer. Frequently, a low level of chain transfer agent such as, for example, a mercaptan at 0.05 percent to 6 percent by weight based on total weight of monomer is employed to control molecular weight.

In another aspect of the present invention, the emulsion-polymerized polymer is prepared by a multistaged emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scamuing electron microscopy using staining techniques to emphasize the difference between the appearance of the phases, for example, is such a technique.

The copolymer of this invention has a glass transition temperature (Tg) of from 0° C. to –80° C., preferably from –20° C. to –80° C. and most preferably from –30° C. to –80° C. as measured by differential scamming calorimetry (DSC) used at a rate of heating of 10° C. per minute with the Tg taken at the first inflection point.

Copolymers of this invention have molecular weights useful for forming a pressure sensitive adhesive. Useful molecular weights are in the range of from 5,000 to 10,000,000, and preferably from 10,000 to 1,000,000.

Adhesive Composition

The adhesive composition of the present invention may be formulated for the chosen end use. The adhesive composition may contain, in addition to the copolymer binder, conventional additives such as, for example, fillers, extenders, antioxidants, tackifiers, stabilizers, flow control agents, dyes and plasticizers. The adhesive composition is prepared by conventional techniques which are known in the art.

The adhesive composition of the present invention may be applied to a variety of substrates, such as, for example, paper, foam, wood, film, tape, cardboard, plastic and corrugated board. The adhesive composition may be applied by methods known in the art such as, air-assisted spray, airless spray, brush, direct coat or transfer coat and roller.

Paper Labels

A paper label consists of a paper basestock with an adhesive composition applied to one face. The label is generally produced by first coating a release coated liner with the adhesive composition by methods well known in the art, generally by roll coating or slot die coating. The paper basestock is then pressed onto the adhesive coated release liner, to form a paper label stock. The paper stock is then converted to paper labels by means known in the art, such as by die cutting.

Filled Paper

The adhesive composition of the present invention is especially useful in preparing paper labels made from filled paper. "Filled paper", as used herein, means papers having from 1% to 50% of an inorganic filler by weight, in which the inorganic filler contains multivalent cation. "Inorganic filler" shall mean multivalent cation filler present in either the paper basestock or in a coating applied to the paper basestock, or in both the paper basestock and a coating on the paper basestock. "Multivalent cation" shall mean any cation, or mixtures of such cations, having a valency greater than one, such as, for example, calcium, magnesium, aluminum. Fillers useful in the present invention include, for example calcium carbonate, aluminum silicate, clay minerals and titanium dioxide. A commonly used filler is one containing calcium ion, such as, for example, calcium carbonate.

Filled paper labels differ from tapes, foams and films in that the filled paper labels of this invention contain significant levels of multivalent cation. Tapes, films and foams do not contain significant levels of multivalent cation. Multivalent cation can crosslink with carboxylic acid groups in adhesive compositions. Crosslinking of the adhesive composition leads to a time dependent deterioration in adhesive strength. The loss of adhesive strength is particularly severe when the labels are stored under conditions of high temperature and humidity. Paper labels having "age resistance" are those which show little or no loss in adhesive strength over time. Paper labels made by the method of the present invention have excellent age-resistance.

Paper labels of this invention may be applied to substrates such as paper, metal, glass, wood, painted surfaces, cardboard, corrugated board and plastic surfaces.

Test Sample Preparation

Label samples were prepared by formulating each latex polymer into an adhesive composition with 0.5 gram of 50% active dioctyl sodium sulfosuccinate (DOSS) as a wetting agent to each 100 g of latex. The formulated adhesive composition was then coated onto bleached 90 pound siliconized polycoated release liner (HP Smith's 8024) with a bullnose-type lab draw down bar, and dried for 5 minutes at 70° C. and 2 minutes at 100° C. to achieve a dry adhesive coat weight of 27 to 30 grams per square meter. The adhesive side of the release liner was then laminated to a calcium carbonate-containing basestock papers. Three basestock papers were used in the examples: 50# uncoated electronic data processing (EDP) paper (3.6% calcium carbonate), Simpson 65# C2S paper (6.6% calcium carbonate), and Champion 60# KK Litho paper (16.7% calcium carbonate).

The laminates were cut into 1 inch (2.54 cm) by 5 inch (12.7 cm) strips and stored for 24 hours at 25° C. and 50 percent relative humidity. The strips were then aged for eight days, with half of the strips conditioned in a humidity cabinet (Hotpack Model 435314) at 50° C. and 85 percent relative humidity, and the other half of the strips remaining at 25° C. and 50 percent relative humidity. After 8 days of aging, all of the strips were stored for an additional 24 hours at 25° C. and 50 percent relative humidity. The release liner was then removed from the strips and the adhesive/basestock laminates were tested for loop tack and peel.

A percentage loss of adhesive strength was calculated by subtracting the adhesive strength of the sample aged at 50° C. and 85 percent relative humidity from the adhesive strength of the sample aged at 25° C. and 50 percent relative humidity and dividing that number by the adhesive strength of the sample aged at 25° C. and 50 percent relative humidity, and multiplying by 100 to obtain a percentage.

$$\% \text{ adhesive strength loss} = \frac{25°\text{C. strength} - 50°\text{C. strength}}{25°\text{C. strength}} \times 100$$

Measurement of Loop Tack

A loop was made from a 1 inch (2.54 cm) by 5 inch (12.7 cm) strip of the cured laminate with the adhesive side out. The ends were taped together with masking tape and the loop was inserted into the jig on a Loop Tester (AMETEK) with one end of the loop pressed onto a clean stainless steel panel. The tester was set to zero then started. The amount of force required to pull the loop from the stainless steel panel was measured and recorded. All samples were tested in triplicate, with the average of the three readings reported in Tables VI, VII and VIII.

Measurement of 180 degree Peel 180 degree peel adhesion is the force required to remove a pressure sensitive adhesive label from a panel at an angle of 180 degrees. A 1 inch (2.54 cm) by 5 inch (12.7 cm) strip of the cured laminate was applied adhesive side down to a stainless steel panel. A 4.5 pound (2 kilogram) roller was passed over the applied label once in each lengthwise direction. Care was taken to ensure that no air bubbles were entrapped. Following a ten minute dwell time the sample was tested on a Instron Model 1011 tensile tester. The peel adhesion is reported in ounces per one inch width. Samples were tested in triplicate, with the average of the three values reported in Tables VI, VII, and VIII.

The mode of failure was also noted as Tear ("T") or Cohesive Failure ("CF"). Tear means that the label failed due to the label tearing. This indicates that the bond strength between the adhesive and the stainless steel panel was greater than the integrity of the paper. Cohesive failure means that the label tears off in one piece, with some adhesive remaining on the stainless steel panel and some on the paper. The preferred mode of failure is by tear, since this provides permanent labels. Permanent labels are preferred by the industry since they prevent people from removing labels from one good and moving them onto other goods.

EXAMPLE 1 (COMPARATIVE)

Preparation of Latex Polymer

Example 1 is a comparative example where the polymer contains 1 percent acrylic acid.

A latex polymer was prepared in the following manner: 800 g of D.I. water was charged to a kettle and heated to 87° C. Next, to the kettle was added a mixture of 0.8 g of sodium carbonate in 20 g of water, 6.1 g of ammonium persulfate in 30 g of water, and 27 g of a 45% solids acrylic latex polymer with a 100 nanometer particle size plus 27 grams of a water rinse. After a five minute hold, a monomer emulsion mixture of 275 g water, 12 g sodium dodecyl benzene sulfonate (23%), 12 g lauryl $(EO)_{11}$ sulfonate sodium salt, 1782 g of butyl acrylate, and 18 g of acrylic acid was slowly added to the kettle over three and one-half hours along with a cofeed containing 2 g of ammonium persulfate in 81 g of water, and a 30 gram water rinse, also added slowly over the same three and one-half hour period. During the addition of the feeds, the kettle temperature was maintained at 85° C. Thirty minutes after completion of the feeds, the kettle was cooled to 60° C. and 15 g of a 0.15% solution of iron (II) sulfate added, followed by two chases, each consisting of 1.1 g of t-butyl hydroperoxide in 5 g of water, and 0.65 g of sodium formaldehyde sulfoxylate. Following addition of the second chaser, the kettle was cooled to 40° C. and the pH adjusted to 6.0 with ammonium hydroxide. The latex polymer was then formulated into an adhesive composition, as described above, and tested for peel and loop tack, with the results listed in Tables VI, VII, and VIII.

EXAMPLE 2

A polymer having 1% of 2-acrylamido-2-methylpropanesulfonic acid was made by the same procedure as in Example 1, with 72 g of a 25% 2-acrylamido-2-methylpropanesulfonic acid in water and 27 g of water substituted for the acrylic acid in the monomer emulsion mixture. The latex polymer was formulated into an adhesive composition and tested for peel and loop tack, with the results listed in Tables VI, VII and VIII.

EXAMPLE 3

A polymer having 1% sodium methallyl sulfonate was made by the same procedure as in Example 1, with a solution of 18 g of sodium methallyl sulfonate in 81 g of water substituted for the acrylic acid in the monomer emulsion mixture. The latex polymer was formulated into an adhesive composition and tested for peel and loop tack, with the results listed in Tables VI, VII and VIII.

EXAMPLE 4

A polymer having 1% sodium vinyl sulfonate was made by the same procedure as in Example 1, with 72 g of a 25% sodium vinyl sulfonate in water and 27 g of water substituted for the acrylic acid in the monomer emulsion mixture. The latex polymer was formulated into an adhesive composition and tested for peel and loop tack, with the results listed in Tables VI, VII and VIII.

EXAMPLE 5

A polymer having 1% phosphoethylmethacrylate was made by the same procedure as in Example 1, with a solution of 18 g of phosphoethylmethacrylate in 81 g of water substituted for the acrylic acid in the monomer emulsion mixture. The latex polymer was formulated into an adhesive composition and tested for peel and loop tack, with the results listed in Tables VI, VII and VIII.

EXAMPLE 6

Each of the latex polymers of Examples 1–5 was formulated into an adhesive composition and applied to 50# uncoated electronic data processing (EDP) paper (3.6% calcium carbonate). Each sample was tested for tack and peel, with the results listed in Table VI below. The results demonstrate that adhesive compositions of the present invention retain more of their adhesive strength, than a comparative adhesive composition.

Sample calculation: for example #1, % loss of adhesive strength in the loop tack test=(4.93−1.83)/4.93×100=63%

TABLE VI

| Example | Acid | Loop Tack 25° C. | Loop Tack 50° C. | % Loss | Peel 25° C. | Peel 50° C. | % loss |
|---|---|---|---|---|---|---|---|
| 1. | Acrylic acid (comparative) | 4.93 | 1.83 | 63 | 5.07 CF | 2.37 | 53 |
| 2. | 2-acrylamido-2-methyl propane-sulfonic acid | 3.87 | 2.40 | 38 | 5.17 CF | 2.67 | 48 |
| 3. | Sodium methallyl sulfonate | 3.47 | 2.23 | 36 | 4.87 T | 2.87 | 41 |
| 4. | Sodium vinyl sulfonate | 4.67 | 3.43 | 26 | 4.50 CF | 3.60 | 20 |
| 5. | Phosphoethyl-methacrylate | 4.13 | 2.23 | 46 | 4.87 CF | 2.67 | 45 |

EXAMPLE 7

Each of the latex polymers of Examples 1–5 was formulated into an adhesive composition and applied to Simpson 65# C2S paper (6.6% calcium carbonate). Each sample was tested for tack and peel, with the results listed in Table VII below. The results demonstrate that adhesive compositions of the present invention retain more of their adhesive strength, than a comparative adhesive composition.

TABLE VII

| Example | Acid | Loop Tack 25° C. | Loop Tack 50° C. | % Loss | Peel 25° C. | Peel 50° C. | % loss |
|---|---|---|---|---|---|---|---|
| 1. | Acrylic acid (comparative) | 6.23 | 2.37 | 62 | 5.90 | 4.57 | 23 |
| 2. | 2-acrylamido-2-methyl propane-sulfonic acid | 2.70 | 3.00 | +11 | 5.60 | 4.90 | 12 |
| 3. | Sodium methallyl sulfonate | 3.30 | 2.47 | 25 | 5.27 | 4.70 | 11 |
| 4. | Sodium vinyl sulfonate | 4.73 | 4.1 | 13 | 5.27 | 4.67 | 11 |
| 5. | Phosphoethyl-methacrylate | 4.37 | 2.90 | 33 | 5.26 | 4.87 | 7 |

EXAMPLE 8

Each of the latex polymers of Examples 1–5 was formulated into an adhesive composition and applied to Champion 60# KK Litho paper (16.7 % calcium carbonate). Each sample was tested for tack and peel, with the results listed in Table VIII below. The results demonstrate that adhesive compositions of the present invention retain more of their adhesive strength, than a comparative adhesive composition.

TABLE VIII

| Example | Acid | Loop Tack 25° C. | Loop Tack 50° C. | % Loss | Peel 25° C. | Peel 50° C. | % loss |
|---|---|---|---|---|---|---|---|
| 1. | Acrylic acid (comparative) | 4.40 | 1.93 | 56 | 3.47 | 2.60 | 25 |
| 2. | 2-acrylamido-2-methyl propane-sulfonic acid | 3.53 | 2.47 | 30 | 2.73 | 2.53 | 7 |
| 3. | Sodium methallyl sulfonate | 2.90 | 2.0 | 31 | 2.73 | 2.20 | 19 |
| 4. | Sodium vinyl sulfonate | 3.37 | 2.83 | 16 | 3.00 | 2.80 | 7 |
| 5. | Phosphoethyl-methacrylate | 2.33 | 2.20 | 6 | 2.77 | 2.47 | 11 |

What is claimed is:

1. An article comprising a filled paper basestock coated on at least one side with a pressure sensitive adhesive composition comprising a copolymer, wherein said copolymer comprises, as polymerized units:
   a) from 0.1 to 5% of an acid monomer or monovalent salts thereof, said acid monomer being selected from the group consisting of vinyl sulfonic acid, methallyl sulfonic acid, phosphoethylmethacrylate, (meth)acrylate sulfonic acid, acrylamido alkyl sulfonic acid, N-(2-sulfo-1,1-dimethylethyl)acrylamide, 2-acrylamido-2-methylpropanesulfonic acid and mixtures thereof; and
   b) from 99.9 to 95% of at least one ethenically unsaturated monomer; wherein the glass transition temperature of said copolymer is in the range of from 0° C. to −80° C.; wherein said copolymer has a molecular weight in the range of from 5,000 to 10,000,000; and wherein said filled paper basestock comprises from 1% to 50% by weight calcium carbonate.

2. The article of claim 1 further comprising a substrate.

3. The article of claim 2 wherein the substrate is selected from the group consisting of paper, metal, glass, cardboard, wood, corrugated board and plastic.

4. The article of claim 5 wherein said copolymer has a molecular weight in the range of from 10,000 to 1,000,000.

5. The article of claim 1 wherein said copolymer comprises, as polymerized units, from 0.2 percent to 5 percent by weight of said acid monomer or monovalent salts thereof.

6. The article of claim 1 wherein the glass transition temperature of said copolymer is in the range of from −20° C. to −80° C.

7. The article of claim 1 wherein said pressure sensitive adhesive composition further comprises at least one additive selected from a group consisting of filler, extender, antioxidant, tackifier, stabilize, flow control agent, dye and plasticizer.

8. A method for preparing a paper label comprising:
   a) forming a copolymer comprising, as polymerized units:
      1) from 0.1 percent to 5 percent by weight of an acid monomer or monovalent salts thereof, said acid monomer being selected from the group consisting of vinyl sulfonic acid, methallyl sulfonic acid, phosphoethylmethacrylate, (meth)acrylate sulfonic acid, acrylamido alkyl sulfonic acid, N-(2-sulfo-1,1-dimethylethyl)acrylamide, 2-acrylamido-2-methylpropanesulfonic acid and mixtures thereof; and
      2) from 99.9 percent to 95 percent by weight of at least one ethenically unsaturated monomer;
   wherein the glass transition temperature of said copolymer is in the range of from 0° C. to −80° C.; wherein said copolymer has a molecular weight in the range of from 5,000 to 10,000,000;
   b) formulating said copolymer into an adhesive composition; and c) applying said adhesive composition to a paper label comprising inorganic filler to form a pressure sensitive adhesive label; wherein said inorganic filler is calcium carbonate and is present at from 1% to 50% by weight.

9. The method of claim 8 wherein said copolymer has a molecular weight in the range of from 10,000 to 1,000,000.

10. The method of claim 8 wherein said copolymer comprises, as polymerized units, from 0.2 percent to 5 percent by weight of said acid monomer or monovalent salts thereof.

11. The method of claim 8 wherein the glass transition temperature of said copolymer is in the range of from −20° C. to −80° C.

12. The method of claim 1 wherein said adhesive composition further comprises at least one additive selected from a group consisting of filler, extender, antioxidant, tackifier, stabilize, flow control agent, dye and plasticizer.

* * * * *

UNITED STATES PATENT AND TRADEMARK OFFICE
CERTIFICATE OF CORRECTION

PATENT NO.      : 6,248,438 B1
DATED           : June 19, 2001
INVENTOR(S)     : Kim Sang Ho and Don Gordon Pierson It is certified that error appears in the above-identified patent and that said Letters Patent is hereby corrected as shown below:

Column 3,
Line 33, change "scamuing" to -- scanning --
Line 39, change "scamming" to -- scanning --

Column 8,
Line 47, change "stabilize" to -- stabilizer --

Signed and Sealed this

Twenty-ninth Day of January, 2002

Attest:

JAMES E. ROGAN
Attesting Officer          Director of the United States Patent and Trademark Office